United States Patent
Örtegren et al.

(10) Patent No.: US 6,962,244 B2
(45) Date of Patent: Nov. 8, 2005

(54) BRAKE MECHANISM AND A METHOD OF CONTROLLING FORCE AMPLIFICATION

(75) Inventors: Anders Örtegren, Landskrona (SE); Stefan Sandberg, Lomma (SE)

(73) Assignee: Haldex Brake Products AB, (SE)

( * ) Notice: Subject to any disclaimer, the term of this patent is extended or adjusted under 35 U.S.C. 154(b) by 0 days.

(21) Appl. No.: 10/470,665

(22) Filed: Jan. 9, 2004

(65) Prior Publication Data

US 2004/0134722 A1    Jul. 15, 2004

Related U.S. Application Data

(63) Continuation of application No. 09/865,628, filed on May 25, 2001.

(30) Foreign Application Priority Data

May 31, 2000 (SE) .................................... 0002058
Oct. 3, 2000 (SE) .................................... 0003547

(51) Int. Cl.[7] ...................... F16D 55/225; F16D 65/18
(52) U.S. Cl. .................. 188/72.7; 188/72.2; 188/72.9; 188/73.31; 188/106 F
(58) Field of Search ...................... 188/72.7, 72.9, 188/72.2, 106 F, 72.6, 72.1, 72.8, 71.1, 73.31, 188/71.8, 71.9, 73.42, 73.32

(56) References Cited

U.S. PATENT DOCUMENTS

| 3,236,336 A | 2/1966 | Harrison | |
|---|---|---|---|
| 6,585,086 B2 * | 7/2003 | Sandberg et al. | ........ 188/73.32 |
| 6,668,981 B2 * | 12/2003 | Ortegren et al. | ........... 188/72.2 |

FOREIGN PATENT DOCUMENTS

| DE | 195 15 063 | 4/1995 |
|---|---|---|
| DE | 196 19 488 | 11/1996 |
| EP | 0 291 071 | 11/1988 |
| EP | 1160476 A2 * | 12/2001 |
| EP | 1160477 A2 * | 12/2001 |
| EP | 1160478 A2 * | 12/2001 |
| EP | 1160479 A2 * | 12/2001 |
| EP | 1160480 A2 * | 12/2001 |
| WO | WO96/12900 | 5/1996 |
| WO | WO 99/06725 | 2/1999 |

OTHER PUBLICATIONS

European Search Report dated Jul. 24, 2003.
Information Disclosure Statement dated May 25, 2001.
Supplemental Information Disclosure Statement dated Sep. 25, 2001.
2nd Supplemental Information Disclosure Statement dated Jun. 19, 2002.

* cited by examiner

Primary Examiner—Douglas C. Butler
(74) Attorney, Agent, or Firm—St. Onge Steward Johnston & Reens LLC

(57) ABSTRACT

The present invention concerns a brake mechanism of a disc brake received in a caliper and a method for controlling the force amplification for the brake mechanism. The brake mechanism comprises a lever actuated by a brake actuator. The lever is acting on a cross bar by means of an intermediate part. The lever and the intermediate part have a line of contact moving along a circular arc during an application stroke of the brake mechanism. The cross bar of the brake mechanism is closely guided and is only moveable in the thrust direction and in the tangential direction of the brake disc. The force amplification of the brake mechanism is adapted to the force characteristics of the brake actuator.

14 Claims, 7 Drawing Sheets

BRAKE MECHANISM AND A METHOD OF CONTROLLING FORCE AMPLIFICATION

RELATED APPLICATIONS

This application is a continuation of copending U.S. patent application Ser. No. 09/865,628, filed May 25, 2001, which claims priority from pending Swedish Patent Application Numbers 0002058-6 filed on May 31, 2000 and 0003547-7 filed on Oct. 3, 2000.

FIELD OF THE INVENTION

The present invention concerns a brake mechanism for a disc brake and a method of controlling the transmission of force from the brake actuator. Especially the invention concerns the lever of the brake mechanism and the force amplification from the brake actuator to the brake pads.

The brake mechanism according to the present invention is primarily intended for a heavy road vehicle but may quite as well be used for a lighter road vehicle or a rail vehicle.

BACKGROUND OF THE INVENTION

Different types of levers acting in different ways on cross bars are previously known. In some embodiments the cross bar or equivalent part is more or less floating while in other embodiments the cross bar is closely guided. Furthermore, the levers acts directly or by means of an intermediate part on the cross bar giving a more or less extended contact surface between the lever or intermediate part and the cross bar. The force application systems of the prior art normally form some kind of eccentric giving a nearly constant transmission of the force of the brake actuator in the form of a pneumatic cylinder or the like.

SUMMARY OF THE INVENTION

The brake actuators, e.g. pneumatic cylinders used to actuate the lever of a brake mechanism normally have a force which will vary depending on the stroke length of the pneumatic cylinder. If the lever and the cross bar of the brake mechanism have a nearly constant amplification of the force of the brake actuator, the brake as such will have a varying effect. Thus, the performance of the brakes will vary depending on the stroke length of the brake actuator and the wear of the brake pads (change of elasticity).

Furthermore the different brakes may give different brake force which in extreme cases may lead to further problems. An object of the present invention is to have brakes which always give the same breaking power of both the right and left brakes.

The brake mechanism may have a modular form, which makes it fairly easy to change different parts to adapt the brake mechanism to the actual actuator. Thus, it is possible to store different levers etc. to be combined with different brake actuators.

By the invention the contact between the lever and the intermediate part is linear. The linear contact between the lever and the intermediate part of the invention reduces friction, wear and hysteresis.

The cross bar and the thrust units will always move in the direction of the normal of the brake disc. In a conventional brake according to the prior art there will be a change of angle. Which leads to a greater risk for inclined wear. The brake mechanism of the present invention makes it possible to control the break characteristics by choosing a suitable cam curve.

The brake mechanism of the present invention is preferably pneumatically actuated, but it may also be hydraulically or electrically actuated.

Further objects and advantages of the invention will be obvious for a person skilled in the art from reading the description below.

BRIEF DESCRIPTION OF THE DRAWINGS

Embodiments of the invention will be more closely described below as a way of example and by reference to the enclosed Figures, in which.

DETAILED DESCRIPTION OF THE DRAWINGS

Figure 1:
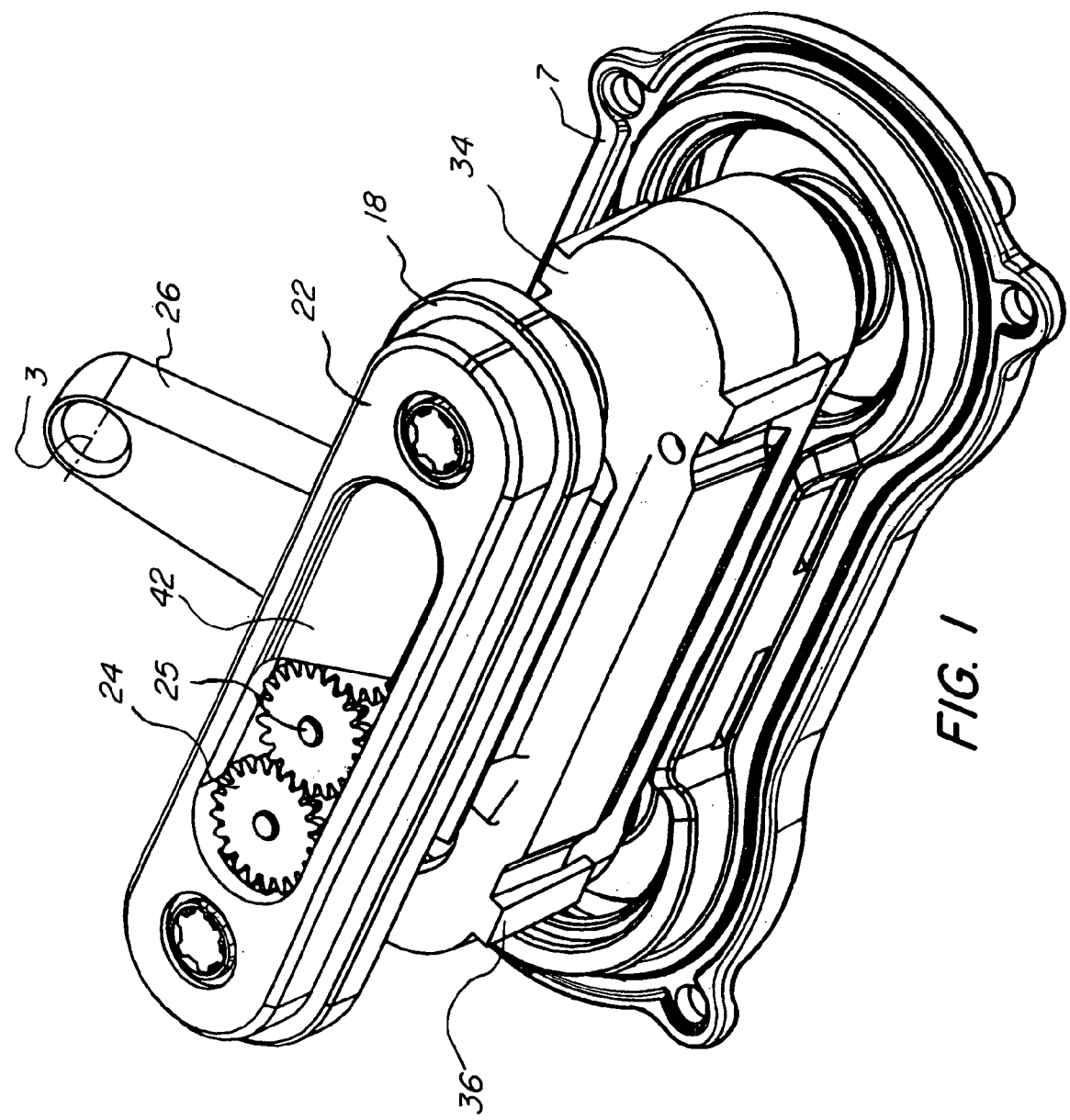
FIG. 1 is a perspective view of a first embodiment of a brake mechanism according to the invention.
Figure 2:
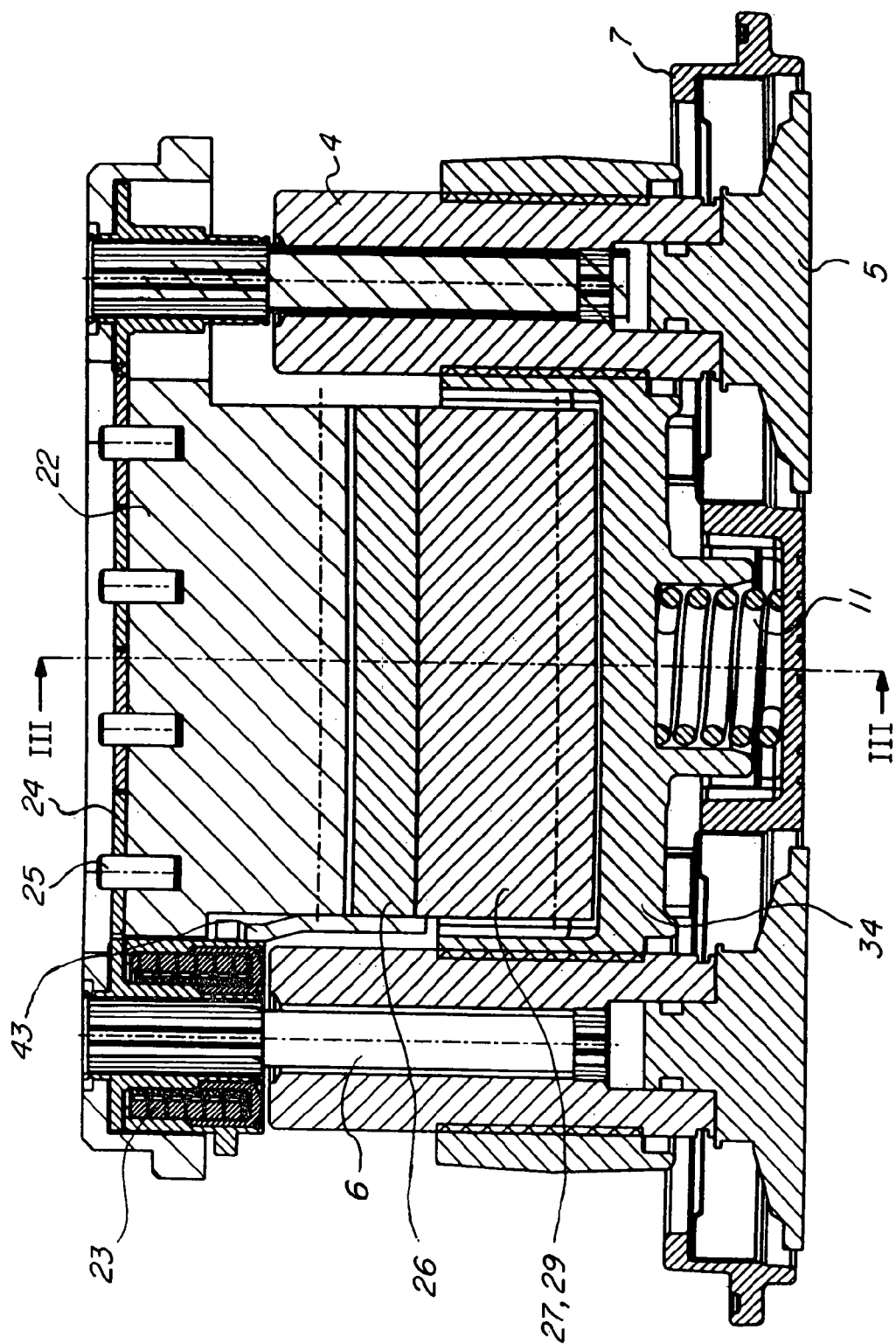
FIG. 2 is a cross section of the brake mechanism of FIG. 1 taken along the line II—II of FIG. 3.
Figure 3:
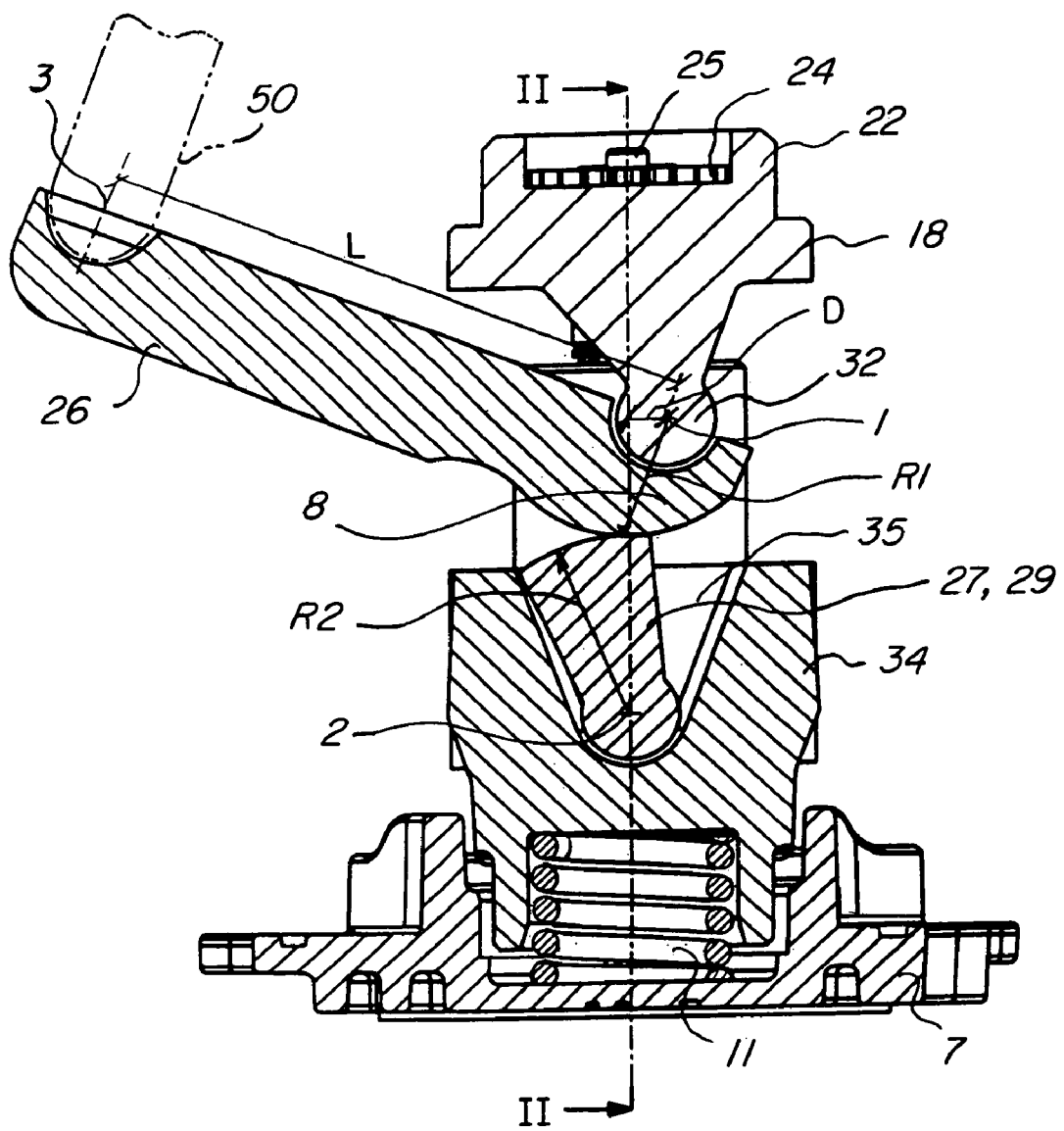
FIG. 3 is a section of the brake mechanism of FIG. 2 taken along the lines III—III of FIG. 2.

A first embodiment of a brake mechanism according to the invention is shown in FIGS. 1 to 3. In this embodiment a lever 26 is mounted in a bearing bracket 22, to be received in an opening of the caliper 16. The caliper 16 is not shown in FIGS. 1 to 3 but it corresponds to the caliper 16 shown in section in FIGS. 5 to 7. The lever 26 acts on a cross bar 34 by means of an intermediate part 27. The lever 26 is supported by a bearing placed in the bearing bracket 22. The bearing of the bearing bracket 22 is a roller bearing or a plain bearing. The cross bar 34 is guided in the caliper 16 in such a way that the cross bar 34 may move in the thrust direction and in the tangential direction of the brake disc (cf. FIG. 7). The cross bar 34 is not movable in a direction perpendicular to these directions. The lever 26 is not fixed to the cross bar 34.

The cross bar 34 has two threaded openings each receiving an adjustment screw 4. Thus, the adjustment screws 4 are rotatably mounted in the cross bar 34. Each adjustment screw 4 is provided with a thrust plate 5, which is to act on a brake pad holder (not shown) or the like. The brake pad will go into contact with the brake disc during activation of the brake. As is known a further brake pad is arranged on the opposite side of the brake disc. The further brake pad is in a known way brought into contact with the brake disc in that the open caliper 16 is moved at the activation of the brake. In the bearing bracket 22 two adjustment and reset shafts 6 are mounted. When the brake mechanism is assembled the adjustment and reset shafts 6 will be received inside the adjustment screws 4. The adjustment and reset shafts 6 are axially moveable but non-rotatably connected to the adjustment screws 4. Furthermore, the brake mechanism comprises a cover 7 fixed to the open caliper 16 at assembly.

The brake force from the piston rod of the brake cylinder (not shown) is transmitted to the mechanism, especially the cross bar 34, by means of the lever 26. The brake cylinder is normally referred to as the brake actuator throughout this description. The lever 26 consists in essence of an arm extending out from what could be called a curved wedge 8 having inner and outer surfaces in engagement with cylindrical surfaces of the intermediate part 27 and the bearing bracket 22, respectively. The inner surface of the curved wedge 8 is cylindrical and co-operates with the bearing bracket 22, whereas the outer surface co-operates with the intermediate part 27. The outer surface of the wedge 8 may not be cylindrical and in the shown embodiment the outer surface of the wedge 8 has a non-cylindrical cam profile. The centres for the inner and outer surfaces are offset in relation to each other. When the lever 26 moves downwards, as shown in FIG. 3, the curved wedge 8 will be forced in between the bearing bracket 22 and the intermediate part 27 pushing the cross bar 34 downwards, accomplishing a brake application. The cross bar 34 will move in a plane essentially perpendicular to the plane of the brake disc.

The lever 26 acts on the cross bar 3 by means of an intermediate part 27. The intermediate part has the form of a rocker 29 in this embodiment but may have other forms in another embodiments. The lever 26 rotates around a first point of rotation 1. The intermediate part 27 rotates around a second point of rotation 2.

The bearing bracket 22 has a protruding part 32 with a cylindrical surface for co-operation with the cylindrical inner surface of the lever 26. A bearing may be placed between the lever 26 and the protruding part 32 of the bearing bracket 22.

The rocker 29 has a cylindrical surface in contact with the outer surface of the wedge 8 of the lever 26. The rocker 29 is received in a groove 35 of the cross bar 34. In the end positions of the movement of the rocker 29 it will abut the sides of the groove 35. The contact surfaces of the groove 35 and the rocker 29 are both cylindrical.

In an alternative embodiment (not shown) a cylindrical stud is placed between the rocker 29 and the bottom of the groove 35.

A return spring 11 is positioned between the cover 7 and the cross bar 34 in order to bring the brake mechanism back to its rest position.

The bearing bracket 22 is received in an opening of the caliper 16. The opening is placed in the wall of the caliper 16 furthest from the brake disc. Thus, the caliper is of an open design. The bearing bracket 22 has a shoulder 18 abutting the inside of the caliper 16 and thus, the bearing bracket 22 is placed in the opening of the caliper 16 from the inside. The reaction of the clamp force of the brake is transmitted by means of the bearing bracket 22 to the open caliper 16. The force of reaction is transmitted via the shoulder 18 of the bearing bracket 22. As the force of reaction is transmitted by means of the shoulder 18 of the bearing bracket 22 the force is transmitted in an area surrounding the opening of the caliper 16. The bearing bracket 22 is a loaded part of the brake mechanism and, thus, the bearing bracket 22 and its shoulder 18 should have enough strength to transmit the force of reaction. A person skilled in the art realises that the shoulder may be placed in the caliper in stead of the bearing bracket, in which case the force of reaction will be transmitted via the edge area of the bearing bracket to the shoulder of the caliper.

A sealing is placed between the bearing bracket 22 and the open caliper 16. The sealing between the bearing bracket 22 and the open caliper 16 is received in a groove of the bearing bracket 22. The groove and thus the sealing may be placed in any position axially or radially in the bearing bracket 22. The inside of the open caliper 16 may be machined via said opening of the caliper 16.

An adjuster mechanism 23 of known construction is placed on top of one of the adjustment and reset shafts 6. When the brake is applied a lever pin 43 of the lever 26 will act on the adjuster mechanism 23. In the bearing bracket 22 a number of gear wheels 24 are placed between gear wheels of the adjustment and reset shafts 6 to transfer and synchronize the movement between the shafts. Each gear wheel is placed on a pin 25 fixed to the bearing bracket 22. The gear wheels 24 are placed under a cover 42 received in the bearing bracket 22. In FIG. 1 the cover 42 is shown partially broken away for clarity. In the shown example there are four gear wheels 24 between the gear wheels of the adjustment and reset shafts 6. A person skilled in the art realises that other numbers of gear wheels may be used. As the adjuster mechanism forms no part of the present invention it will not be described further here.

At least one of the adjustment and reset shafts 6 is furnished with a suitable head to receive a tool used to reset the thrust units when the brake pads are to be replaced. This movement will be transferred to the other adjustment and reset shaft 6 by means of the set of gear wheels 24. The adjustment and reset shaft 6 is rotated in the normal way until the distance between the thrust plates 5 and the brake disc is sufficient to receive the new brake pads. Then the adjustment and reset shaft 6 is rotated in such a way that the distance between the thrust plates 5 and the brake disc corresponds to the desired running clearance. The at least one adjustment and reset shaft 6 is received in a sealed opening of the bearing bracket 22.

The cross bar 34 is supported by four protruding parts 36 of the cross bar and the return spring 11 in the cover 7. The protruding parts 36 of the cross bar 34 abut the inside of the open caliper 16. The part of the caliper 16 in contact with the protruding parts of the cross bar 34 is machined to give a smooth surface. The machining is done via the opening of the open caliper 16. The return spring 11 is guided in an opening in the cross bar 34 and acts between the cross bar 34 and the cover 7. The return spring 11 is received in a holder of the cover 7. The cross bar 34 is free to move in the thrust direction along the machined part and in one direction perpendicular to the thrust direction. The latter direction is the tangential direction of the brake discs. In an alternative embodiment the cross bar 34 is guided on guide sleeves (not shown) placed around the screws that are used to fix the cover 7 to the open caliper 16.

When the brake is activated the lever 26 will press the intermediate part 27, the cross bar 34 and thus the thrust plates 5, via the adjustment screws 4 and the brake pads in direction towards the brake disc (not shown). When the brake pads hits the brake disc, the pads will move in the tangential direction of the brake disc a short distance before the brake pads hit a support (not shown). The movement in the tangential direction of the brake disc is normally not more than a few millimetres. The lever 26, the intermediate part 27, the cross bar 34 and the thrust units of the brake mechanism will follow the brake pads in their movement. During this movement the lever 26 will slide in the bearing bracket 22. The cross bar 34 will move in the tangential direction of the brake disc guided by the protruding parts 36 of the cross bar 34 or the guide sleeves. The cover 7 is fixed to the caliper 16 and will not move. The movement between the cross bar 34 and the cover 7 is taken up by the return spring 11. When the brake is released the return spring 11 will bring the cross bar 34 back to its centred position. The lever 26, the intermediate part 27 and the thrust units will move with the cross bar 34 into the centred position. Thus, the return spring 11 resets the brake mechanism both in the thrust direction and sideways.

The cover 7 is fixed to the open caliper 16 by means of screws. The cover 7 has openings to receive the thrust units. There is a clearance between the cover 7 and the thrust units allowing the thrust units to move in any direction in relation to the cover 7.

The second embodiment of FIGS. 4 to 7 correspond to the above embodiment in many ways and the corresponding parts will not be described further.

In the embodiment of FIGS. 4 to 7 the lever 31 has a protruding part received in a slide bearing 33 of the bearing bracket 30. The lever 31 acts on an intermediate part 27 in form of a stud 28, which acts on the cross bar 37. The stud 28 is received in a groove of the cross bar 37 by means of a bearing. The surface of the lever 31 in contact with the intermediate part 27 is shown as cylindrical but may have other curve forms. In this embodiment the lever 31 has no wedge form.

Figures 5, 7:
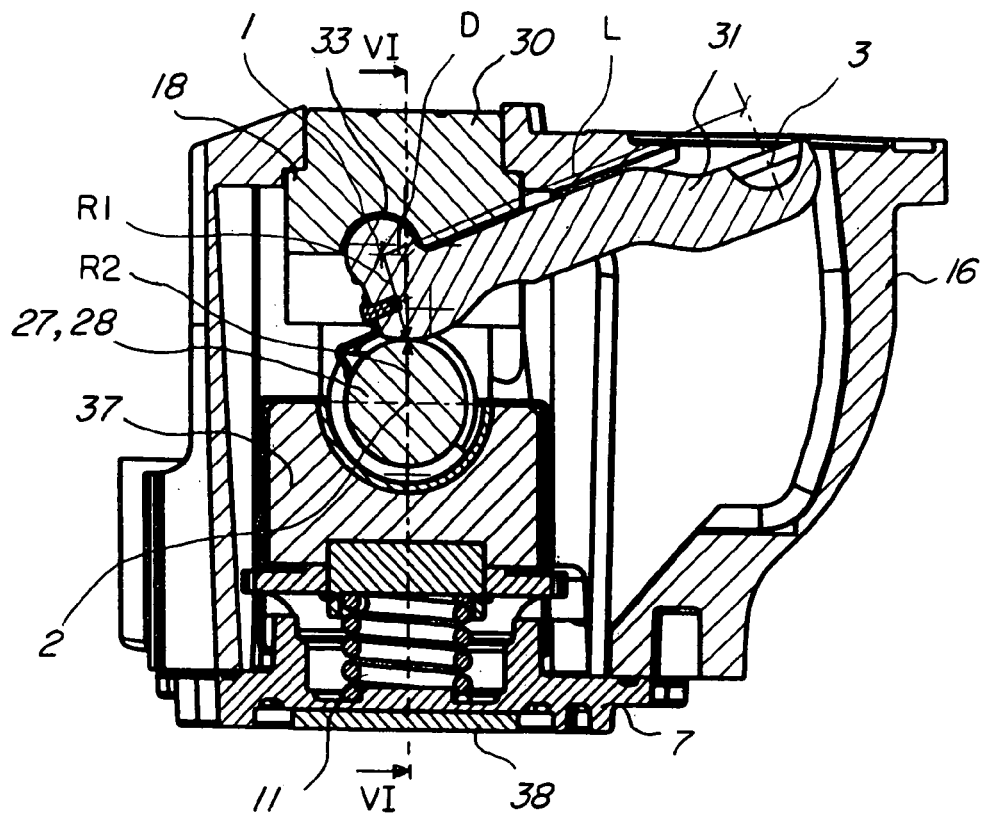
FIG. 5 is a cross section of the brake mechanism of FIG. 4 placed in a caliper, taken along the lines V—V of FIG. 6.
FIG. 7 is a cross section taken along the line VII—VII of FIG. 6.
Figure 6:
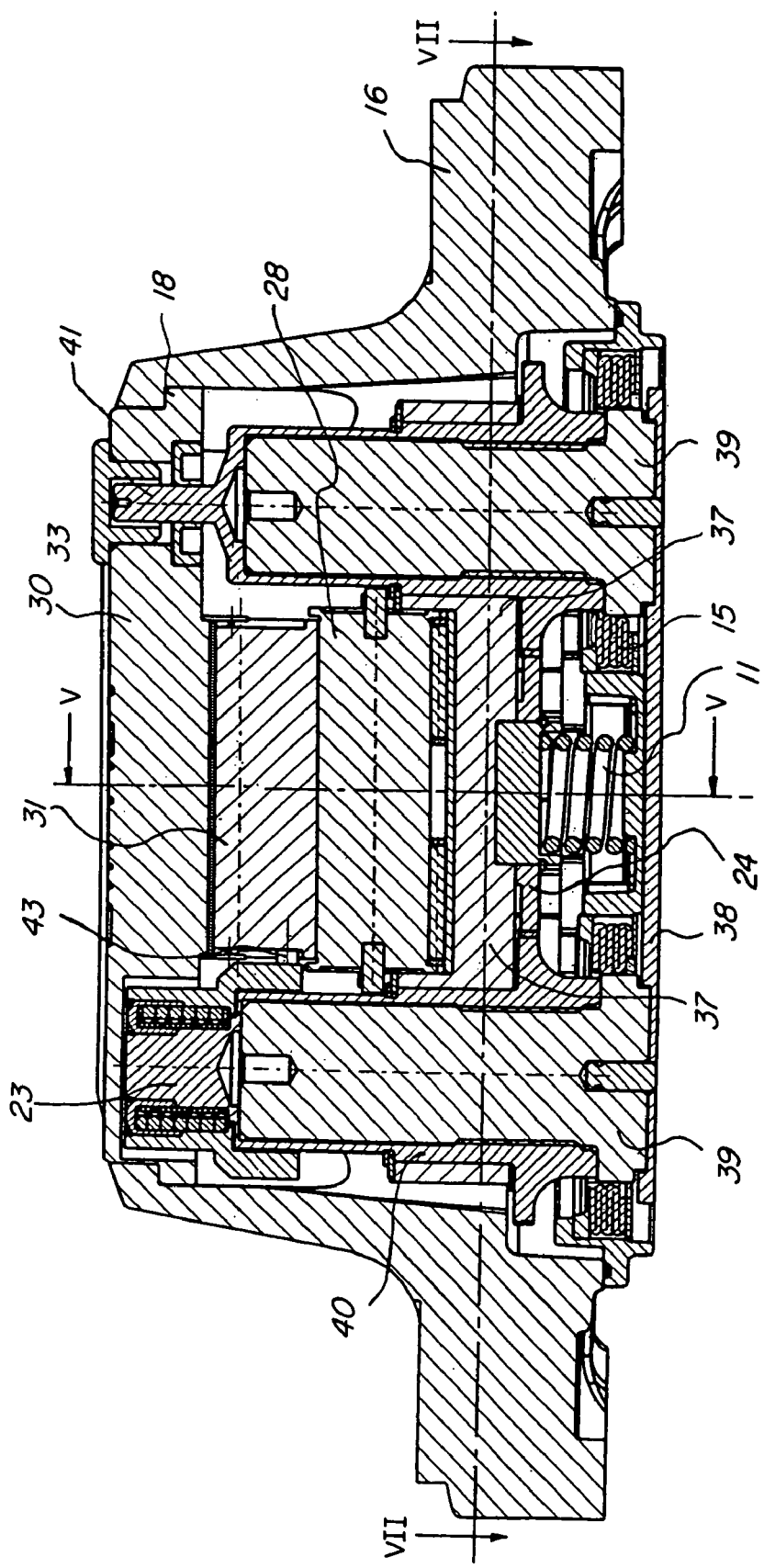
FIG. 6 is a cross section taken along the lines VI—VI of FIG. 5.

As indicated in FIG. 7 the cross bar 37 is guided in the caliper 16 in such a way that it is not moveable in a direction perpendicular to the thrust direction or the tangential direction of the brake disc.

In the second embodiment the thrust units are connected with a single, common thrust plate 38, which thrust plate 38 acts on a brake pad. The thrust units each comprises a thrust screw 39. The thrust screws 39 have an opening at the bottom, which receives a stud on the thrust plate 38. The studs of the thrust plate 38 and the openings of the thrust screws 39 are formed to lock the thrust screws 39, thus hinder them from rotating. This is important for control of the distance between the brake pads and the brake disc.

One of the thrust units is further furnished with the adjuster mechanism 23 as stated above and an adjuster shaft 40. The adjuster mechanism 23 is placed on top of the thrust screw 39. The other thrust unit is furnished with a reset shaft 41. The shafts 40, 41 are drivingly connected by means of a set of gear wheels 24. The set of gear wheels 24 are placed in the area between the cover 7 and the thrust plate 38. The function of the gear wheels is the same as for the set of gear wheels 24 of the first embodiment.

The adjuster mechanism 23 co-operates with the lever 31 by means of a lever pin 43. The shafts 40,41 and the screws 39 of the thrust units may rotate relative each other, which is of importance for adjustment of slack in the disc brake. The shafts 40,41 have the form of sleeves placed on the outside of the thrust screws 39.

To protect the brake mechanism from road dirt bellows 15 are placed between the thrust plates 5 and the cover 7. In the shown embodiment the bellows 15 are placed in a heat protection ring. The bellows 15 are normally also present in the embodiment of FIGS. 1 to 3 but are not shown in said Figures.

Figure 4:
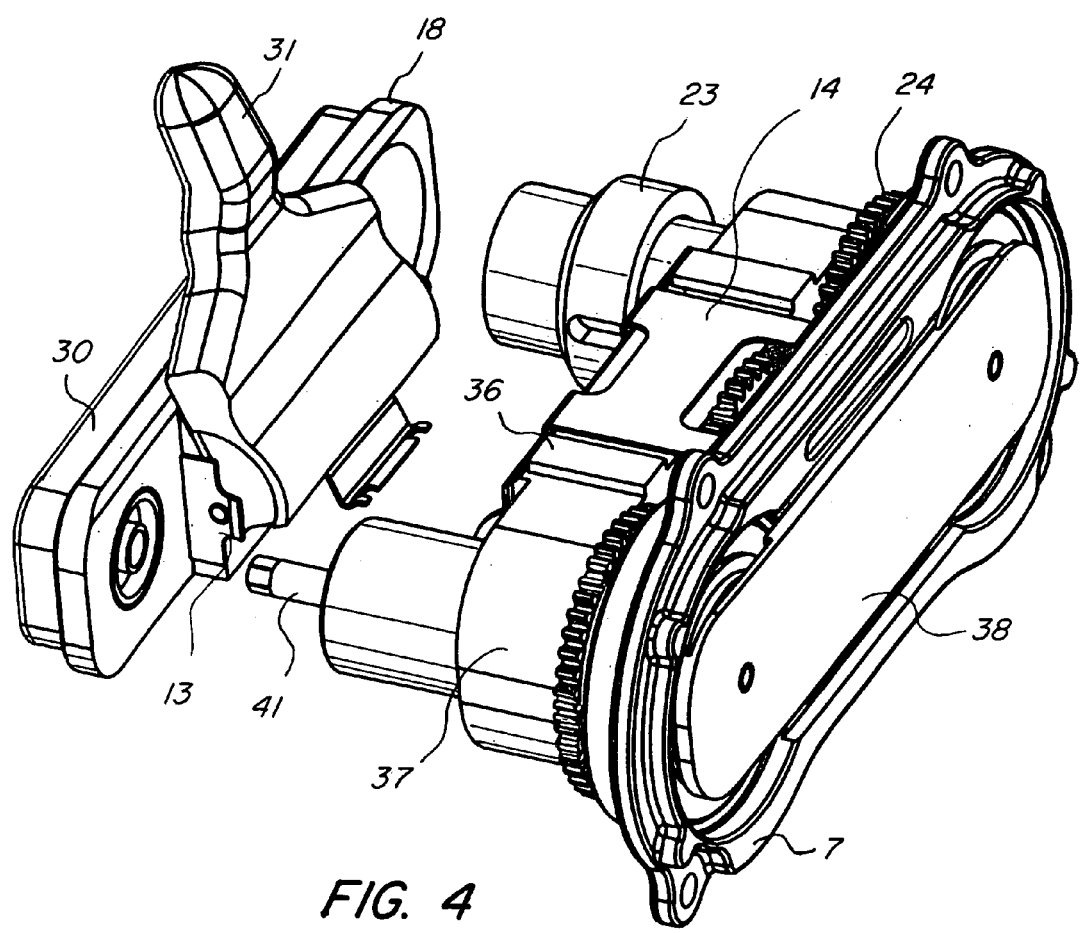
FIG. 4 is a perspective view of a second embodiment of a brake mechanism according to the invention.

As shown in FIG. 4 the brake mechanism may have a modular form. In FIG. 4 one module consists of the bearing bracket 30 and the lever 31. The lever 31 is attached to the bearing bracket by means of a clip 13. A second module is formed by the rest of the brake mechanism and is held together by a brace 14. The modular form may be advantageously concerning assembly and maintenance.

A person skilled in the art realises that the lever and intermediate part according to the present invention may be used independently of if the brake mechanism is of modular form or not. He also realises that the lever and intermediate part may be used even if the brake mechanism has no bearing bracket.

In a further embodiment (not shown) the lever is turned around compared to the previous embodiments. The turning is made in such a way that the intermediate part 27 and the lever change places. Thus, in this embodiment the intermediate part 27 will be received in the bearing bracket and the lever will be in direct contact with the cross bar.

The lever and the intermediate part function in practice in the same way for all the above embodiments. The lever 26,31 and the intermediate part 27 are in contact with each other along a line. Thus, they have a line of contact, which will reduce friction and wear compared to the normal extended area of contact between the lever and the cross bar or an intermediate part. The line of contact between the lever 26,31 and the intermediate part 27 moves along a cam profile which may be a circular arc. The cam profile has a distance R1 in relation to the point of rotation 1 for the lever and a radius R2 in relation to the point of rotation 2 for the intermediate part 27. The distance R1 varies as the lever 26 of the first embodiment moves if the outer surface of the wedge 8 has a non-cylindrical curve form. The distance R1 is a radius if the surface of the lever in contact with the intermediate part is cylindrical. The intermediate part 27 is supported in the cross bar 37 via a roller bearing. The intermediate part 27 has two flanges between which the lever 26,31 is received. The surface of the intermediate part 27 in contact with the lever 26,31 is cylindrical having a radius R2. Thus, also the part of the intermediate part 27 in contact with the lever 26,31 moves along a circular arc having the radius R2 in relation to the point of rotation 2 of the intermediate part 27.

The lever 26,31 has an elongated part the upper part of which co-operates with the actuator. At the opposite end the lever 26,31 has a protruding part or a recess received in a recess or protruding part, respectively of the bearing bracket 22,30. Thus, the lever 26,31 is supported between the bearing bracket 22,30 and the intermediate part 27. The lever 26,31 has an active length L between a position 3 where the brake actuator acts on the lever and the point of rotation 1 for the lever. The positions of the points of rotation 1,2 for the lever 26,31 and the intermediate part 27, respectively are offset a distance D from each other.

Figure 8:
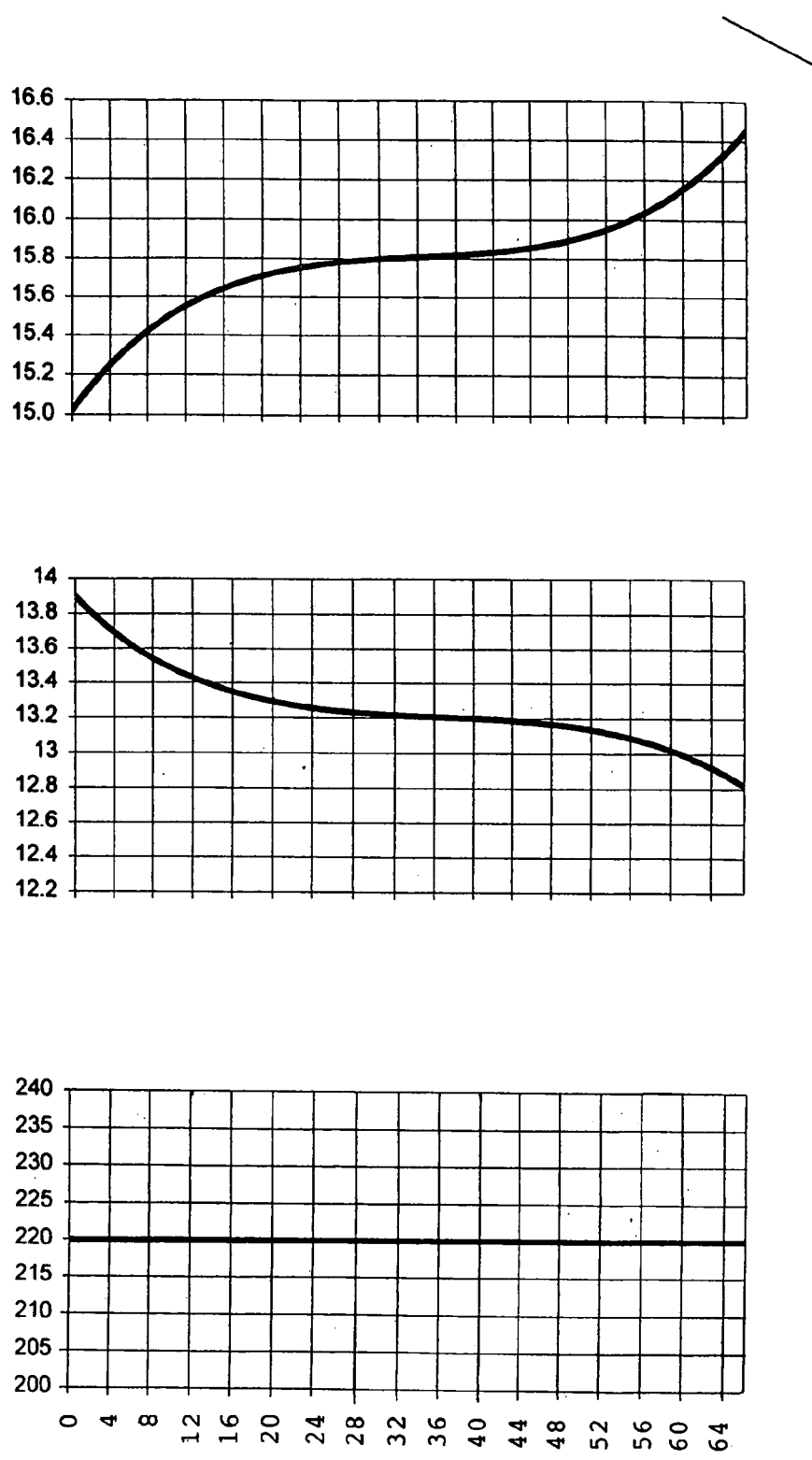
FIG. 8 shows schematically three graphs relating to the force versus stroke of the brake actuator and the lever of the disc brake, respectively, and the aggregate of the two.

When the brake is applied the lever 26,31 will rotate in the bearing 33 of the bearing bracket 22,30. By varying the radius R2, the offset distance D, the curve form of the surface of the part of the lever 26,31 in contact with the intermediate part and the length of the lever 26,31 it is possible to vary the force amplification characteristics of the brake mechanism. In an ideal situation the force should be the same independent of the stroke length of the brake actuator. If a pneumatic cylinder 50 is used to actuate the brake lever 26,31, such a cylinder normally gives a force dependant on stroke length as indicated in the middle graph of FIG. 8. As shown in the graph, the force follows a sloping curve, having a stronger inclination at the beginning and end of the stroke. By making the variations as stated above it is possible to form a characteristic for the lever ratio versus stroke length of the brake actuator, which is a mirror image of the characteristic of the pneumatic cylinder 50, as shown in the middle graph. A suitable characteristic for the lever ratio for the lever 26,31 versus stroke length of the brake actuator is shown in the upper graph of FIG. 8. The result of the two characteristics will be a force executed on the brake pads which is independent of the stroke length of the brake actuator as indicated in the lower graph of FIG. 8.

Thanks to the module form of the brake mechanism it is easy to change lever 26,31, bearing bracket 22,30 and/or intermediate part 27 in order to make the alterations of the force amplification characteristics as stated above.

A person skilled in the art realises that the lever and intermediate part may be used in many different types of brake mechanisms.

What is claimed is:

1. A brake mechanism of a disc brake received in a brake caliper reaching over a brake disc, which brake mechanism comprises a lever actuated by a brake actuator, characterized in that the lever acts on a cross bar of the brake mechanism by means of an intermediate part, which lever and intermediate part have a line of contact moving along a cam profile during an application stroke of the brake mechanism, and that the caliper receives the cross bar in such a way that the cross bar is movable in a thrust direction and in a tangential direction of the brake disc but hindered to move in a direction perpendicular to the thrust direction; and whereas, said intermediate part is received in a groove of the cross bar and is movable within the groove such that said intermediate part rotates about a first fixed point of rotation within a body of the intermediate part during an application stroke of the brake mechanism.

2. The brake mechanism of claim 1, characterized in that the intermediate part is a rocker received in the groove of the cross bar and that the rocker is movable within the groove.

3. The brake mechanism of claim 1, characterized in that the intermediate part rotates in relation to the first fixed point of rotation and the lever rotates in relation to a second point of rotation.

4. The brake mechanism of claim 3, characterized in that a surface of the lever and the intermediate part in contact move along the cam profile having a distance from the point of rotation for the lever and a radius from the point of rotation for the intermediate part, respectively.

5. The brake mechanism of claim 4, characterized in that the distance from the point of rotation for the lever varies depending on the position of the lever.

6. The brake mechanism of claim 4, characterized in that the cam profile is a circular arc.

7. The brake mechanism of claim 4, characterized in that the points of rotation for the lever and the intermediate part are offset from each other with a distance in the plane of the lever.

8. The brake mechanism of claim 3, characterized in that the lever has an active length between the point of rotation of the lever and a position in which the actuator goes into contact with the lever.

9. The brake mechanism of claim 3, characterized in that the brake mechanism comprises a bearing bracket received in an opening of the caliper in the wall furthest from the brake disc and that the lever is received in the bearing bracket by means of a bearing.

10. The brake mechanism of claim 9, characterized in that the lever, the bearing bracket and/or the intermediate part are exchangeable in order to alter the force amplification of the brake mechanism.

11. The brake mechanism of claim 3, characterized in that force amplification of the brake mechanism can be adapted to the force characteristics of the brake actuator.

12. The brake mechanism of claim 11, characterized in that the force amplification characteristics of the brake mechanism can be controlled by amending the radius of the circular arc followed by a line of contact between the lever and the intermediate part, the offset distance between the points of rotation of the lever and the intermediate part, respectively, the form of the outer surface of the lever in contact with the intermediate part and/or the active length of the lever.

13. The brake mechanism of claim 12, characterized in that the radius, the offset distance, the form of the outer surface of the lever and/or the active length of the lever can be controlled to give constant brake force independent of the stroke length for the brake actuator acting on the lever.

14. The brake mechanism of claim 13, characterized in that the brake actuator is a pneumatic cylinder.

* * * * *